United States Patent
Kogut-O'Connell et al.

(10) Patent No.: US 7,797,397 B2
(45) Date of Patent: Sep. 14, 2010

(54) METHOD, SYSTEM, AND STORAGE MEDIUM FOR MANAGING ACCESS TO JOB-SPECIFIC INFORMATION, APPLICATIONS, AND PHYSICAL LOCATIONS

(75) Inventors: Judy J. Kogut-O'Connell, Hopewell Junction, NY (US); Donna M. Platt, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1601 days.

(21) Appl. No.: 10/160,389

(22) Filed: May 31, 2002

(65) Prior Publication Data

US 2003/0233263 A1 Dec. 18, 2003

(51) Int. Cl.
*G06F 15/16* (2006.01)

(52) U.S. Cl. .................................................. 709/217

(58) Field of Classification Search ......... 709/214–219, 709/203, 223–224, 246
See application file for complete search history.

(56) References Cited

U.S. PATENT DOCUMENTS

| | | | | |
|---|---|---|---|---|
| 5,523,942 A | * | 6/1996 | Tyler et al. | 705/4 |
| 5,829,003 A | * | 10/1998 | Okura | 707/100 |
| 5,873,095 A | * | 2/1999 | Gore | 707/200 |
| 5,898,871 A | * | 4/1999 | Williamson et al. | 719/315 |
| 5,913,198 A | * | 6/1999 | Banks | 705/36 R |
| 6,049,776 A | * | 4/2000 | Donnelly et al. | 705/8 |
| 6,134,561 A | * | 10/2000 | Brandien et al. | 707/104.1 |
| 6,235,176 B1 | * | 5/2001 | Schoen et al. | 705/4 |
| 6,347,305 B1 | * | 2/2002 | Watkins | 705/26 |
| 6,738,772 B2 | * | 5/2004 | Regelski et al. | 707/10 |
| 6,742,002 B2 | * | 5/2004 | Arrowood | 707/104.1 |

\* cited by examiner

*Primary Examiner*—Hussein A Elchanti
(74) *Attorney, Agent, or Firm*—Cantor Colburn LLP; Derek Jennings

(57) ABSTRACT

An exemplary embodiment of the invention relates to a method, system, and storage medium for managing access to job-specific information, applications, and physical locations. The system includes a network server in communication with client systems, and further includes: a database of employee records and a database of job code records both accessible to at least one of the client systems via the network server; an employee directory database including employee names and employee contact information; and an access management tool executable by the server. The access management tool processes changes to access requirements, updates respective databases, and transmits notices to designated client systems. The invention also includes a method and a storage medium.

10 Claims, 4 Drawing Sheets

METHOD, SYSTEM, AND STORAGE MEDIUM FOR MANAGING ACCESS TO JOB-SPECIFIC INFORMATION, APPLICATIONS, AND PHYSICAL LOCATIONS

BACKGROUND

This invention relates generally to access management and control systems, and more particularly, the present invention relates to a method, system, and storage medium for managing access to job-specific information, applications, and physical locations.

Virtually every business in operation today utilizes some form of security system to protect the integrity of its buildings and structures, as well as its proprietary and confidential data. For many businesses, security is considered to the single most important objective. Safeguarding these assets, however, can be an enormous task, particularly for large entities.

Various tools have been developed to address these concerns. For example, security badges may be issued for controlling access to specified facilities, parking lots, entrance ways, offices, etc. Employee password accounts limit access to computers and applications based upon position and job-specific criteria. Confidential records, whether stored on a computer disk or in a file cabinet folder are secured through these password designations and/or by locks on office doors.

While many of these tools may be suitable for a specific purpose, they alone cannot address the varying and complex security needs of most larger businesses today. For example, password access tools may be inefficient for businesses that experience significant (or even average) turnover in personnel. As new employees are hired to replace retired, transferred, terminated employees, or simply to fill new positions of a growing business, a system must be able to handle these changes or the security of the business may be jeopardized. The problem is compounded when considering the ripple effect caused by changes in personnel. Human resources, IT, physical security, management, etc., are some of the departments affected by these changes. For example, an employee directory must be continuously modified to reflect personnel changes, a human resources department must modify and update employee files, and a system administrator must do likewise for computer accounts. Further, physical security must be addressed in accordance with the business' procedures which may include changing locks, issuing/retrieving employee badges, keycards, etc. The same or similar processes would take place for employee transfers, promotions, or similar change in personnel. Modification of management and supervisory assignments must also be updated to reflect changes in employment status.

Currently, these procedures and authorizations are done individually with separate forms stored on different systems which are transmitted from location to location for approval and administrative processing. The affected employees may be required to track the progress of the forms. It is not uncommon to find an ex-employee's name on the company directory months after termination. For the same reasons set forth above, it is no surprise that auditing these disjunct processes can also be problematic for the business.

It is, therefore, desirable to provide a means for managing access and control to job-specific information, applications, and physical locations associated with a business enterprise.

BRIEF SUMMARY

An exemplary embodiment of the invention relates to a method, system, and storage medium for managing access to job-specific information, applications, and physical locations. The system includes a network server in communication with client systems, and further includes: a database of employee records and a database of job code records both accessible to at least one of the client systems via the network server; an employee directory database including employee names and employee contact information; and an access management tool executable by the server. The access management tool processes changes to access requirements, updates respective databases, and transmits notices to designated client systems. The invention also includes a method and a storage medium.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
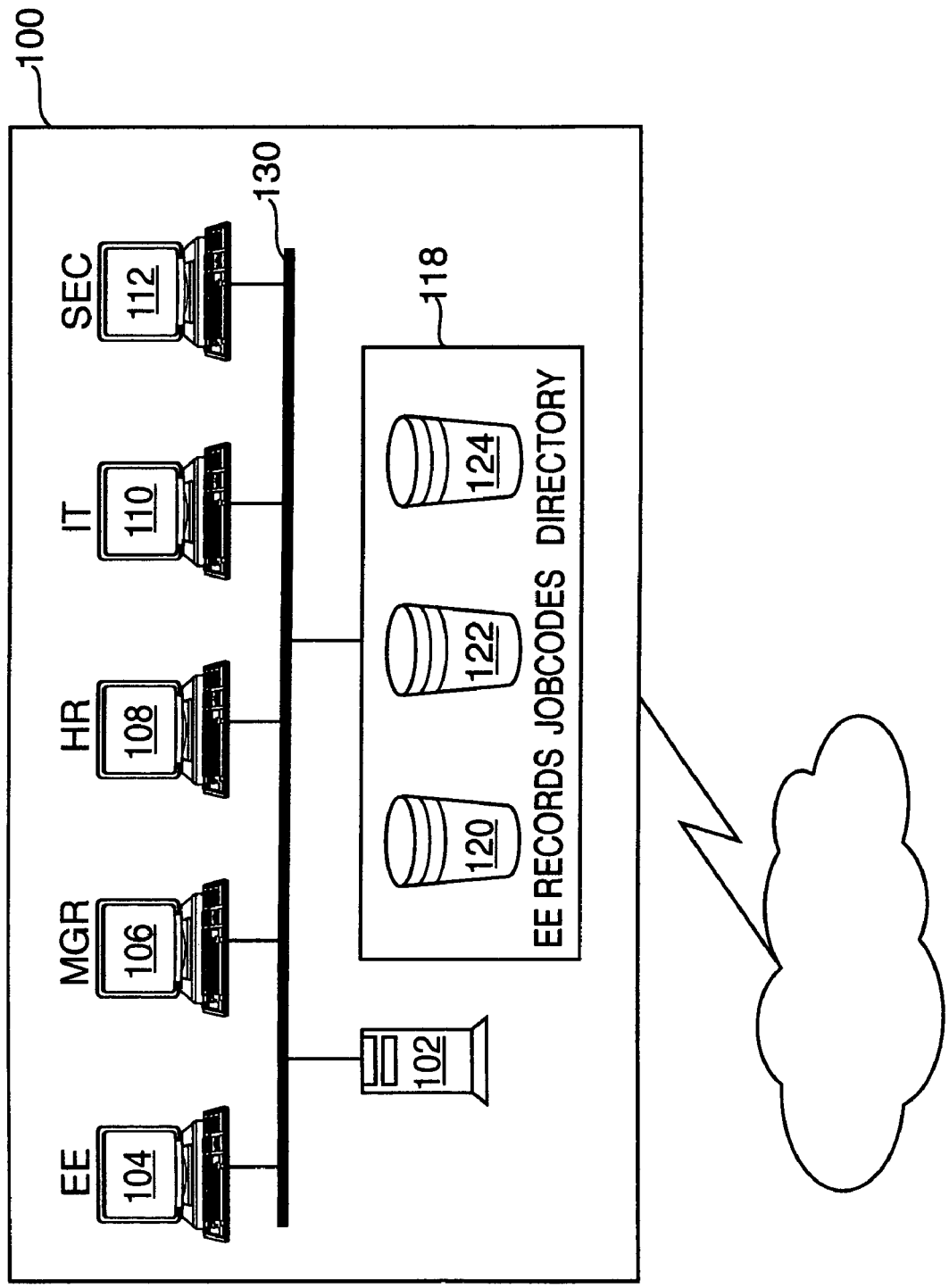
FIG. 1 is a block diagram of computer network system in which the access management tool is implemented in a preferred embodiment of the invention.

In an exemplary embodiment, the access management tool is implemented via a networked system such as that depicted in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 represents a business enterprise comprising a server 102, client systems 104-112 and databases 120-124 each in communication via a network 130. Network 130 may comprise a LAN, a WAN, or other network configuration known in the art. Further, network 130 may include wireless connections, radio-based communications, telephony-based communications, and other network-based communications. For purposes of illustration, however, network 130 is a LAN.

For purposes of illustration, system 100 is running Lotus Domino (™) as its server software. Server 102 executes the access management tool, among other applications utilized by system 100. Server 102 is also running a groupware application such as Lotus Notes (™) which supports replication capabilities and provides e-mail services.

Groupware applications are well known to those skilled in the art and include email, messaging, calendaring, and a host of multi-media tools. Likewise, client systems of server 102 employ suitable client-side applications for facilitating the groupware tools utilized by server 102 such as web browser programs and email software. Server 102 also executes application software used by the access management tool including database management software such as IBM's DB2 (™).

Server 102 provides access and other related services to employees of system 100 such password administration, human resources administration, physical security assistance as well as other services. Server 102 also retrieves data stored therein for use by authorized client systems of system 100. A data storage device 118 resides within network 130 and may comprise any form of mass storage configured to read and write database type data maintained in a file store (e.g., a magnetic disk data storage device). Data storage device 118 is logically addressable across a distributed environment such as a system 100. The implementation of local and wide-area database management systems to achieve the functionality of data storage device 118 will be readily understood by those skilled in the art. Information stored in data storage device 118 is retrieved and manipulated via server 102.

Server 102 may be connected to an external network (e.g., Internet) in order to facilitate communications with outside entities and may extend the services provided by the access management tool to its remote offices, subsidiaries, etc.

Client systems 104-112 represent computer processing devices such as a general-purpose desktop computer or similar device. Client systems 104-112 are in communication with server 102 via network 130.

Client system 104 is operated by a lower level employee of system 100. Users of client system 104 are typically granted limited access to system resources such as word processing applications, e-mail, and job-specific software necessary in order for users to perform their jobs.

Client system 106 is operated by a supervisor or manager of the employee operating client system 104. Users of client system 106 are typically granted extended access to system resources beyond that which are granted to users of client system 104. Users of client system 106 may be given access to employee records for personnel under their charge in order to perform access management and/or auditing via the access management tool as will be described further herein.

Client system 108 is operated by a human resources representative charged with the administration of employee records. In a preferred embodiment, users of client system 108 have superior access to employee records in order to facilitate processing of new hires, transfers, terminations, etc. Human resources personnel of system 100 may also employ commercial applications to facilitate implementation of the access management tool such as IBM's HRAccess®.

Client system 110 is operated by a system administrator of system 100 who is charged with maintaining network 130 and its applications. The system administrator performs various other functions such as creating and maintaining password accounts for employees of system 100.

System 100 further includes client system 112 which may be operated by a security manager of system 100. A security manager is charged with the physical security of the building (s) of system 100 in terms of monitoring entranceways, external grounds, parking lots, as well as the internal office spaces. For organizations that issue badges for controlling physical access, the security manager or department would have access to information necessary to implement the security plan set in place by the business.

It will be understood that any number of client systems may be used by system 100 in order to realize the advantages of the invention. Further, the access levels granted as described above with respect to client systems' 104-112 access to network information may include 'read only' access restrictions if desired by the business enterprise.

Figure 2:
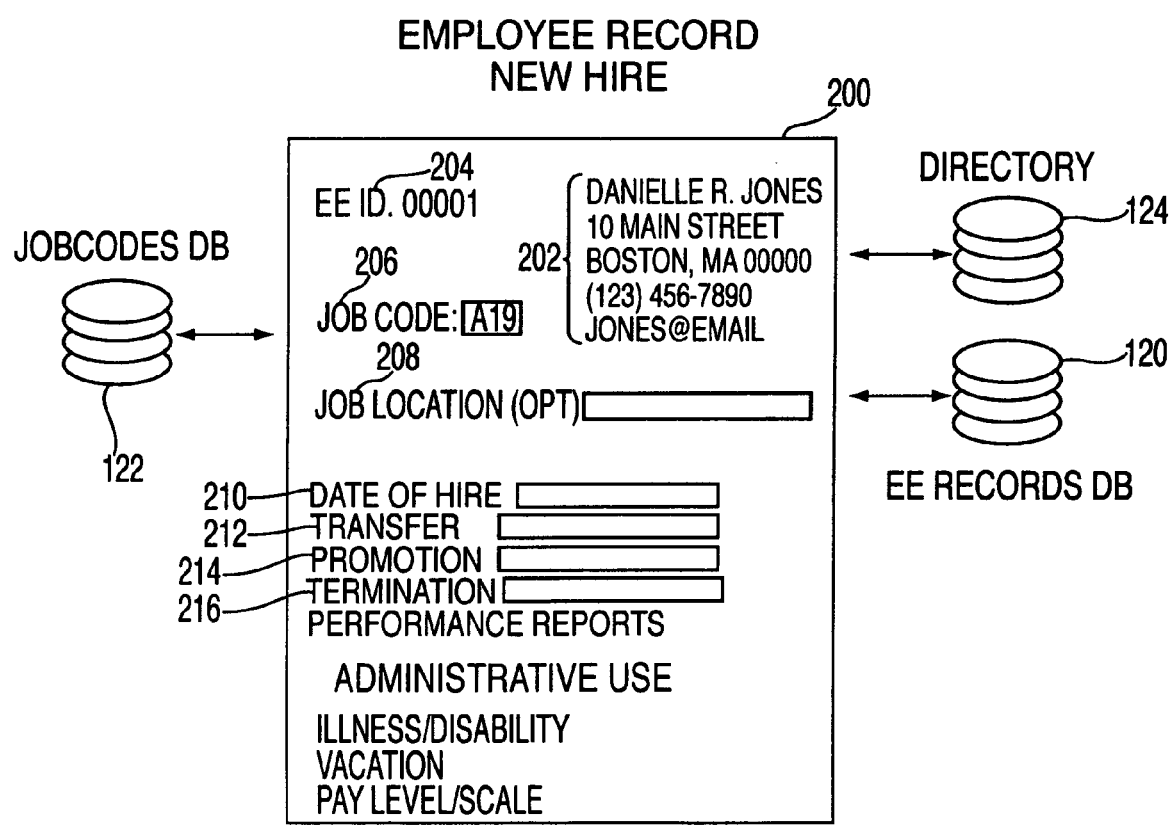
FIG. 2 is a computer screen window illustrating a sample employee record created by the access management tool.

Server 102 utilizes databases 120-124 provided by system 100 and executes the access management tool of the invention. Databases include an employee record database 120, a job code database 122, and a directory database 124. Employee record database 120 stores a variety of information pertaining to each employee of system 100. A sample employee record 200 is displayed in FIG. 2 for illustrative purposes. Employee record 200 contains the employee's name, address, phone number, business e-mail address, and other personal data (not shown) such as social security number and birth date 202. Employee record 200 also includes an identification number in ID field 204 which uniquely identifies the employee. Record 200 further includes an employee job code field 206 which has been established for the position for which the employee has been hired. Job codes are further described in FIG. 3. A job location field 208 is provided and may be optionally utilized in addition to job code field 206 for further specifying an employee's position. For example, in large organizations with multiple facilities, Job codes may be further specified according to geographic location.

Record 200 preferably includes information fields for further defining an employee's status within system 100. Information fields include date of hire 210, transfer field 212, promotion field 214, and termination field 216. These can be used for auditing purposes as well as general administrative purposes as will be described further in FIG. 4.

Information stored in record 200, as well as employee records database 120, is accessible to authorized client systems of system 100 as described herein.

Figure 3:
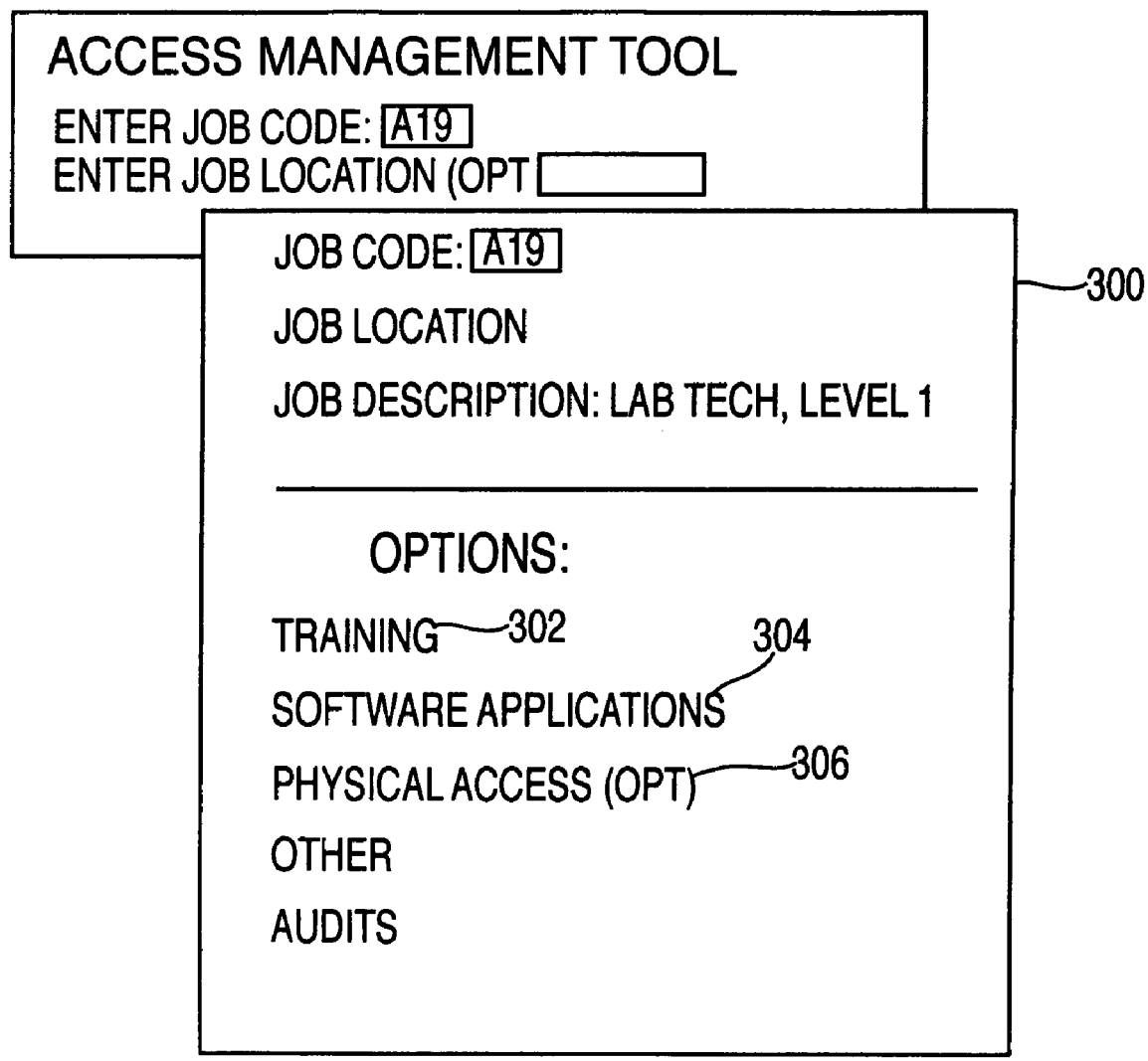
FIG. 3 is a computer screen window illustrating a sample job code record.

Job code database 122 stores information relating to the various job positions available with respect to system 100. For example, job titles such as administrative clerk, mail clerk, lab technician, department manager, etc. would each have a designated job code. A job code may comprise any alphanumeric character string adopted by system 100. A sample job code record is illustrated in FIG. 3 for illustrative purposes. A user with permissions accesses job code record 300 via the access management tool by entering a job code A19 (and optionally a job location) where indicated by the tool and the job code record 300 is presented. A description of the job is provided in record 300 as well. Other information that may be provided in job code record 300 include a training link 302, a link to a listing of applications available for this job code 304, physical access permissions 306, and any other information desired by system 100. For example, a user selects 'training' and is directed to a library of course materials, references, relevant job-specific manuals, etc. designed for the designated job code.

Database 124 contains a listing of all of the employees of system 100 and related contact information such as email addresses.

Whenever changes affecting access occur, relevant information can be provided via the access management tool, and replicated at scheduled time intervals. Additionally, server 102 may be programmed to systematically conduct scheduled replications, whereby database replicas are temporarily stored in a queue awaiting replication (not shown). Replications may be scheduled by system 100 as frequently as desired in order to provide access to the most current, up-to-date information.

Figure 4:
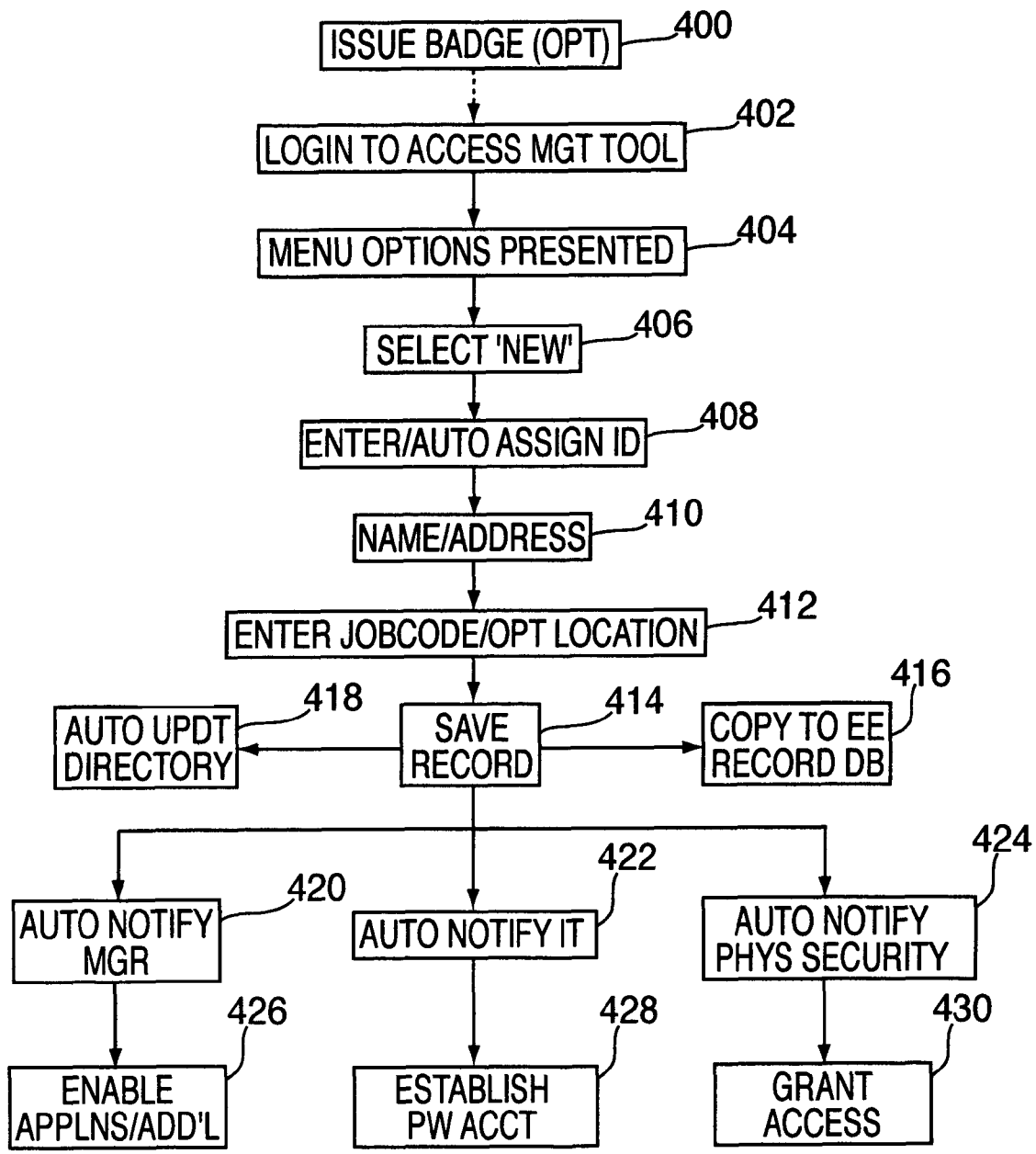
FIG. 4 is a flowchart describing the process of implementing the access management tool in an exemplary embodiment of the invention.

FIG. 4 illustrates the process for creating a new employee record utilized by the access management tool in a preferred embodiment of the invention. A newly-hired employee may be required to show a badge before an orientation session and/or before being permitted access to the employer's facilities. In this situation, the process begins at step 400 whereby the employee is issued a badge. Badge security systems typically include a photograph of the employee and an identification number uniquely assigned to that employee. Other information may be included on the badge as well. The employee is then permitted physical access to a location for further processing. If a badge security system or similar type of security system is not in place, the process described in FIG. 4 would alternatively begin at step 402 as described herein.

A human resources representative, or other authorized person charged with the administration of newly hired employees (also referred to as 'user') logs on to the access management tool at step 402. A menu of options is presented at step 404. Such options may include creating a new record, editing an existing record, viewing one or more records, and establishing an audit schedule.

The user selects 'create new record' at step 406 and either enters an ID 204 for the employee or an ID 204 is automatically created by the tool at step 408. For employers utilizing a badge security system, the ID provided on the badge may be used for this step. The user then enters the personal information 202 at step 410. A job code 206 (and optionally a job location 208) is entered at step 412. Other information may be provided by the user while creating the record as desired. Once the information has been entered, the user saves the record at step 414. Saving the record causes a copy of the information to be stored in employee record database 120 at step 416. Further, the company directory database 124 may be automatically updated to include selected information on the record at step 418. Finally, automatic notifications are sent to the manager assigned to the job code, the IT representative, and physical security manager at steps 420, 422, and 424, respectively. These notifications may be by e-mail or other communication means.

Once a manager receives the notification, he/she is instructed by the tool to 'enable' the applications necessary for the employee of that job code at step 426 and any additional applications that may be necessary. The IT representative is instructed by the tool to establish a password account for the employee at step 428. The physical security manager is instructed by the tool to authorize physical access in order for the employee to gain access to offices, laboratories, libraries, conference rooms, etc. at step 430.

During the establishment of the new record, the human resources representative may also create an audit schedule for the record. This can be accomplished by flagging any or all of fields 212-216 to send an alert to selected recipients upon modification of these fields. For example, suppose the employee listed in record 200 is promoted to Lab Tech, Level 2 within the same department. The modification to field 214 causes an alert to be transmitted to the manager for the new job code assigned (which in this case, is the same manager), IT department, physical security manager, and any entities designated by the tool to receive this information. Any instructions for updating this new information would follow as described above. Reminder notices may be sent to these entities if desired where there has been a failure to act in accordance with the instructions provided. Automatic auditing procedures may also be established. For example, a human resources representative can flag a job code for auditing activities to be conducted twice a year in order to verify continuing access requirements and the employment status of employees in that job code. Other criteria for selecting an audit can be determined as desired such as by department, facility, etc.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A system for managing access to job-specific information, applications, and physical locations, said system including a network server in communication with client systems, the system comprising:
   a database of employee records accessible to at least one of said client systems via said network server;
   a database of job code records accessible to at least one of said client systems via said network server, the job code records including a job code associated with a job position and:
      a training link;
      a software applications link comprising references to computer software applications authorized for use by an employee identified with said job code; and
      a physical access link;
   an employee directory database including employee names and employee contact information; and
   an access management tool executable by said server;
   wherein said access management tool processes changes to access requirements, updates respective databases, and transmits notices to designated client systems.

2. The system of claim 1, wherein said client systems include computer processing devices operated by personnel of said system, said personnel including at least one of:
   a human resources representative;
   a low level employee;
   a manager;
   a system administrator; and
   a physical security manager.

3. The system of claim 1, further comprising an audit component operable for verifying continued accuracy of information stored in said system.

4. The system of claim 1, wherein said employee records include:
   an employee ID;
   employee personal data;
   a job code; and
   administrative data.

5. The system of claim 4, wherein said employee ID is a badge number.

6. The system of claim 4, wherein said employee records further comprise a job location.

7. The system of claim 4, wherein said administrative data comprises at least one of:
- a hire date;
- a transfer date;
- a promotion date; and
- a termination date.

8. The system of claim 1, wherein said training link includes references to job-related information comprising at least one of:
- training materials;
- courses; and
- online resources.

9. The system of claim 1, wherein said physical access link comprises references to physical locations authorized for entry by an employee assigned to said job code.

10. The system of claim 2, wherein said audit component includes an option to schedule and conduct audits of said employee records, job code records, and employee directory.

* * * * *